United States Patent
Meier et al.

[11] Patent Number: 6,070,786
[45] Date of Patent: Jun. 6, 2000

[54] METHOD OF PRODUCING AND UTILIZING DEFORMABLE WORKPIECES FOR HIGH-PRESSURE FORMING AND PRODUCTS FORMED THEREBY

[75] Inventors: Markus Meier, Winterthur; Beat Stump, Urdorf; Werner Urech, Kaiserstuhl, all of Switzerland

[73] Assignee: Elpatronic AG, Bergdietikon, Switzerland

[21] Appl. No.: 09/333,405

[22] Filed: Jun. 15, 1999

Related U.S. Application Data

[62] Division of application No. 08/908,335, Aug. 7, 1997, abandoned.

[30] Foreign Application Priority Data

Aug. 15, 1996 [CH] Switzerland ............................ 2002/96

[51] Int. Cl.⁷ ............................ B21D 39/02; B23K 31/02; B23P 19/10
[52] U.S. Cl. .......................................... 228/157; 29/421.1
[58] Field of Search .................................... 228/157, 137, 228/118; 29/421.1, 422.2

[56] References Cited

U.S. PATENT DOCUMENTS

| | | | |
|---|---|---|---|
| 3,650,005 | 3/1972 | Kamiya et al. | 29/157.3 V |
| 3,807,009 | 4/1974 | Ostbo | 29/157 A |
| 3,895,436 | 7/1975 | Summers et al. | 228/157 |
| 5,263,638 | 11/1993 | Douglas | 228/118 |
| 5,284,288 | 2/1994 | Woodward | 228/157 |
| 5,323,536 | 6/1994 | Fowler et al. | 29/889.72 |
| 5,323,953 | 6/1994 | Adderley et al. | 228/157 |
| 5,330,092 | 7/1994 | Gregg et al. | 228/157 |
| 5,333,775 | 8/1994 | Bruggemann et al. | 228/157 |
| 5,503,322 | 4/1996 | Schutz | 228/137 |
| 5,603,449 | 2/1997 | Mansbridge et al. | 228/157 |
| 5,611,944 | 3/1997 | Gilkinson et al. | 219/117.1 |

*Primary Examiner*—Patrick Ryan
*Assistant Examiner*—Kiley Stoner
*Attorney, Agent, or Firm*—McCormick, Paulding & Huber LLP

[57] ABSTRACT

To form a body, a preform is produced by welding together two essentially flat sheet-metal blanks at their margins. This preform is then deformed in a mold by internal high-pressure forming to produce the desired body. In this way, complex metal bodies can easily be formed.

3 Claims, 2 Drawing Sheets

METHOD OF PRODUCING AND UTILIZING DEFORMABLE WORKPIECES FOR HIGH-PRESSURE FORMING AND PRODUCTS FORMED THEREBY

This application is a divisional of Ser. No. 08/908,335 filed Aug. 7, 1997, now abandoned.

BACKGROUND OF THE INVENTION

The invention relates to a method of making a preform for internal high-pressure metal forming, as well as to a preform produced by the method. The invention further relates to a method for producing a body from the preform, and to a body produced by the method.

It is known to shape tubular metal objects by "hydroforming": for example reference can be made to EP-A-0620056, which shows how a tubular body is assembled from a number of tube sections to form a preform. In "hydroforming", ie. internal high-pressure forming, the tube is deformed by subjecting the interior of the tube to pressure, usually hydraulic pressure, so that it is permanently deformed and is pressed against a mold surrounding the tube. This process is basically known.

Tubular preforms used hitherto have enabled a multitude of essentially tubular bodies to be shaped by subjecting the preform to internal high-pressure forming. However, there exists a need for other kinds of bodies, eg. containers, and in particular fuel tanks, which hitherto have not been produced by internal high-pressure forming. At present, fuel tanks made of metal are formed from two deep-drawn halves each having a peripheral flange. The halves are positioned with their flanges in register, and are joined together in a sealed manner by roller seam welding at the flanges. Although this method of manufacture yields good results, one drawback is the space taken up by the welded flange extending around the tank. For technical reasons associated with the welding, this flange must have a certain width. Also, the shape of the tank is subject to restrictions due to the minimum radii which are imposed.

Besides containers, it may be disadvantageous for other bodies, such as supports for example, if their design is restricted to a tubular cross-section.

Therefore, the problem which poses itself is to extend the use of internal high-pressure metal forming to non-tubular bodies, in particular containers and supports. A further problem which is posed is to provide a fuel tank made of metal which achieves the best possible ratio between overall dimensions and capacity and on which in particular the peripheral flange is extremely small or non-existent.

SUMMARY OF THE INVENTION

These problems are solved firstly by providing a method of making a preform for the internal high-pressure forming in which at least two sheet-metal blanks are positioned with their surfaces facing each other and are welded together The problem is also solved by a corresponding preform.

By welding together two superimposed blanks of any desired shape, a preform which may be of any desired shape, and which is different from known tubular preforms, is made. If this preform is "inflated" in a mold by internal high pressure, a body of any desired shape within the design parameters of the forming process can be made.

BRIEF DESCRIPTION OF THE DRAWINGS

Embodiments of the invention will now be described in detail by way of example and with reference to the drawings, in which.

DESCRIPTION OF THE PREFERRED EMBODIMENTS

Figure 1:
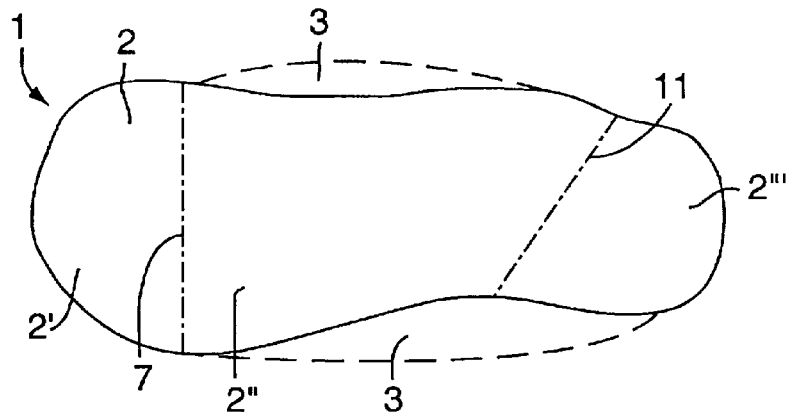
FIG. 1 is a top view of a preform.

FIG. 1 is a schematic top view of a preform 1, consisting of an upper sheet-metal blank 2 overlying a lower sheet-metal blank 3. The blanks 2 and 3 may have corresponding plan forms, in which case the blank 3 is not visible when viewed from above. However, the blank 3 could for example be partly non-congruent with the blank 2, with eg. the parts of the blank 3 illustrated with broken lines projecting beyond the blank 2. The size of the blanks is optional; they may for example be 70 cm long and approximately 30 cm wide at the widest point in the case of a preform which is to be subsequently formed into a fuel tank. These dimensions should be taken merely as an example. They can be larger or smaller. Similarly, the material of the blanks can be freely selected from among known coated and uncoated sheet-metal materials, and is chosen to suit the operating environment of the body to be formed. If the preform 1 is to be used to form a fuel tank, a corresponding coated sheet-metal material will be used for both blanks 2,3.

The individual blanks 2,3 may in themselves, be assembled from a number of segments which have been welded together. The assembly of such sheet-metal panels, called "tailored blanks", is known. In FIG. 1, this is indicated by way of example for the upper blank 2 with the segments 2',2" and 2'", which are joined together by the weld seams 7 and 11 shown in chain-dotted lines. This enables localised areas of the blanks to be adapted to the particular application.

Figure 2:
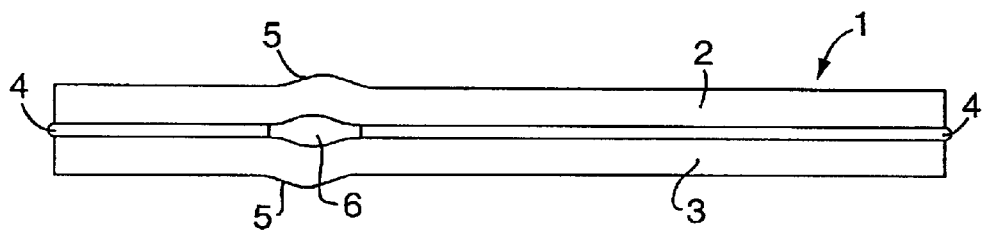
FIG. 2 is a side view of a preform.

FIG. 2 shows, likewise in highly schematic form, a side view of a preform consisting of the two superimposed blanks 2 and 3. In the example shown, these blanks are flat, and one lies on top of the other. The blanks are welded together at their edges around their periphery, as indicated by the weld seam 4. In the example shown, both blanks 2 and 3 have a bead 5 stamped into the margin. Together, the beads form an opening 6 which is not closed upon welding, and into which the fluid for the internal high-pressure forming process is injected under pressure between the two blanks 2 and 3, as will be explained in detail later.

Figure 3:
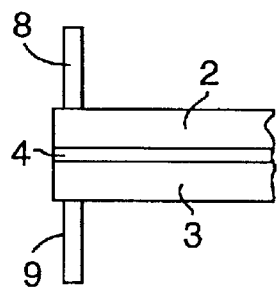
FIG. 3 shows the margin of a preform undergoing roller seam welding.

FIG. 3 shows the margin of the superimposed blanks 2 and 3 on a larger scale. Here two electrodes 8 and 9 in the form of rollers are also shown, and these produce a lap weld 4 in these superimposed blanks 2 and 3, as is known in principle. The electrode rollers 8 and 9 traverse the entire periphery of the blanks 2 and 3, and weld them together. Only those regions which are used for injecting the fluid for the internal high-pressure forming are left unwelded. With this welding technique, a flange is left on the body after forming, but it can be smaller than is required in the usual production methods.

Figure 4:
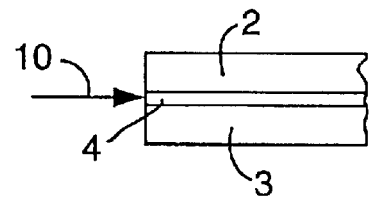
FIG. 4 shows the margin of a preform undergoing laser weldings.

FIG. 4 shows the margin of a further preform with superimposed blanks 2 and 3. In this instance welding is performed by means of the laser beam 10 directed onto the blanks. This welding method is also known in itself, and does not need to be described in more detail here. This method leaves a particularly small flange on the body produced from the preform. The laser may be made to impinge on the blanks from different directions, with the laser beam impinging, not in the horizontal direction shown (0°), but in a direction rotated through up to ±90° thereto.

Figure 5:
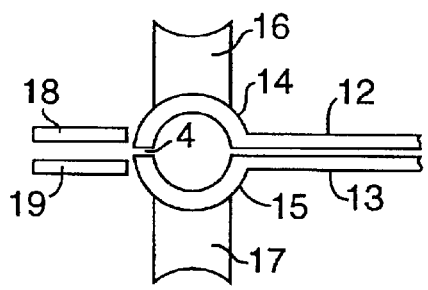
FIG. 5 shows the configuration of the margin of a further preform.

FIG. 5 shows, highly schematic form, the margin of a further preform. This comprises the blanks 12 and 13, which again are superimposed. The margins of both blanks are provided with stamped beads 14 and 15 respectively, in such a way that the front faces of the blanks are butted together. To enable such blanks to be welded, roller dies 16 and 17 may be provided, which roll on the blanks and exert on them a pressure which squeezes the front faces together. A weld seam 4 can then be produced by roller seam-welding by means of two electrode rollers 18 and 19. In this case also, edge regions are left unwelded in order that fluid can subsequently be injected between the blanks. Only one blank-half need be stamped to leave a fluid passage.

Figure 6:
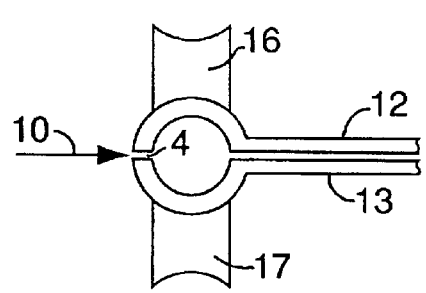
FIG. 6 shows the preform of FIG. 5 undergoing laser welding.

FIG. 6 shows the margin of a preform which is similar to that of FIG. 5 and also comprises blanks 12 and 13 with a bead stamped in the margin. The blanks, pressed together by means of the roller dies 16 and 17, are in this case welded by means of a laser beam 10. The preforms shown in FIG. 5 and FIG. 6 produce a flangeless body after forming.

Figure 7:
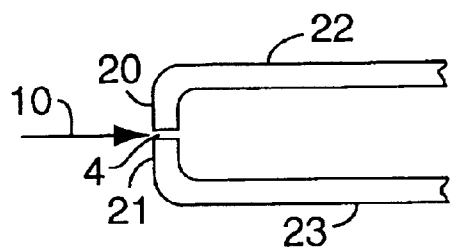
FIG. 7 shows a further configuration of the margin of a preform.

FIG. 7 shows the margin of a further preform. This comprises the blanks 22 and 23, each of which has a bent-up rim 20 and 21 respectively. As can be seen from FIG. 7, the end faces of these bent-up rims are butted together and can be welded eg. by means of a laser beam 10 as before, in order to join the blanks by a weld seam 4. Here also, regions are left unwelded for injection of the fluid for internal high-pressure forming. This preform also yields a flangeless body.

Figure 8:
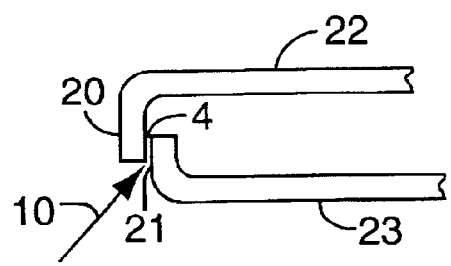
FIG. 8 shows a further configuration of the margin of a preform.

FIG. 8 shows a similar configuration of a preform to that of FIG. 7. In this case the bent-up rim 20 of the blank 22 is configured so that it overlaps the bent-up rim 21 of the blank 23. Here again, a welded joint with a seam 4 can be obtained by means of a laser beam 10.

Figure 9:
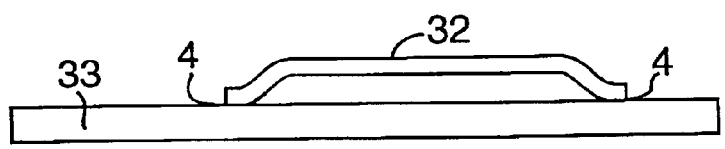
FIG. 9 shows a preform in sectional elevation.

FIG. 9 shows in highly schematic form, in section, another configuration of a preform. In this case a larger blank 33 is provided, on which a smaller blank 32 with a joggled margin is welded. In this example the internal high-pressure forming of the blanks may be arranged so that only the blank 32 is deformed to produce a larger cavity. The blank 33 may assume additional functions, eg. it may serve as bottom plate or support.

Figure 10:
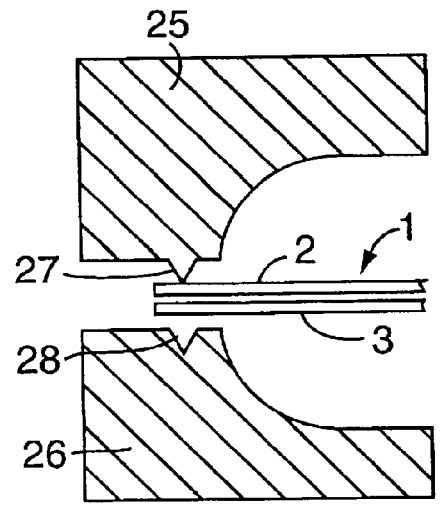
FIG. 10 is a section view of a mold with a preform arranged therein.

FIG. 10 shows highly schematically, in section, part of the dies 25 and 26 which are used in a known manner in internal high-pressure forming. In this process, the preform is placed in dies 25 and 26 of the opened mold and connections are made for the fluid feed, which is usually located in the parting plane of the dies 25 and 26. The dies are then closed, and fluid is forced into the preform through the feed con-nections at a pressure of a few hundred to a few thousand bar, so that the preform expands under plastic deformation and is pressed against the internal surfaces of the dies 25,26. After the preform has been shaped into the desired body, the fluid is released and the body is removed from the mold after the dies 25,26 have been opened.

As can be seen from FIG. 10, an arrangement can be provided for gripping the new preform according to the invention at the margin between the two dies 25 and 26. For example, one die 26 may have a groove 28 and the other die 25 a corresponding protuberance 27, so that when the dies are closed the preform is deformed at its margin and is clamped between the two dies 25 and 26. Alternatively, the restraining force may be applied simply by frictional forces between plane faces. This reduces the loading on the weld seam during internal high-pressure forming.

FIG. 10 does not show how the fluid is injected into the preform in the parting zone between the two die 25 and 26. The preform can, as already described with reference to FIG. 2, be provided for this purpose with lateral openings 6 onto which a fluid feed formed in the dies 25,26 can be pressed so that fluid passes between the two blanks 2 and 3. When the fluid is introduced between the blanks, the latter are gradually deformed so that the desired shape of the body is obtained from the preform.

The fluid may, of course, be introduced through some other opening. One such suitable opening, for example, is the filling hole of a tank, or other available openings may be used. In this case, the blanks can be welded uninterruptedly, with a continuous seam.

What is claimed is:

1. Method of making a body using a preform comprising the steps of:
    positioning at least two sheet metal blanks with shaped edge regions and two spaced apart sheet surfaces in a superimposed relationship with one another so that edge faces of the blanks face each other in an abutting relationship;
    welding the edge faces together to form a preform;
    placing the preform in a mold; and
    deforming the preform in the mold by internal high-pressure forming.

2. Method according to claim 1, characterised in that a localised region of the preform is gripped in the mold.

3. Method of making a body using at least two sheet-metal blanks, each blank having an edge region, the method comprising the steps of:
    shaping the edge regions of the blanks so as to enable the placement of the edge regions of the two blanks in overlapping relationship when the two blanks are in superimposed relationship with one another;
    positioning the blanks so that the edge regions are in an overlapping relationship to one another;
    welding the edge regions together at locations where the regions are in overlapping relationship to form a preform;
    placing the preform in a mold; and
    deforming the preform in the mold by internal high-pressure.

* * * * *

UNITED STATES PATENT AND TRADEMARK OFFICE
CERTIFICATE OF CORRECTION

PATENT NO. : 6,070,786
DATED : June 6, 2000
INVENTOR(S) : Markus Meier et al.

It is certified that error appears in the above-identified patent and that said Letters Patent is hereby corrected as shown below:

Column 1, line 55, after "together" please insert --.--.

Column 3, line 15, after "shows," please insert --in--.

Signed and Sealed this

Twenty-second Day of May, 2001

Attest:

NICHOLAS P. GODICI

*Attesting Officer*        *Acting Director of the United States Patent and Trademark Office*